United States Patent
Excoffier et al.

(10) Patent No.: US 12,335,335 B2
(45) Date of Patent: Jun. 17, 2025

(54) CLOUD FINANCIAL LOAD OPTIMIZATION BASED ON POWER AND THERMAL STATISTICS AGGREGATION

(71) Applicant: INTERNATIONAL BUSINESS MACHINES CORPORATION, Armonk, NY (US)

(72) Inventors: Franck Excoffier, Katy, TX (US); Brent William Yardley, Hillsboro, OR (US); Matthew Hulsey Caughman, Houston, TX (US); Rayyan Memon, Fulshear, TX (US); Bader Ali-Saleh, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 17/708,487

(22) Filed: Mar. 30, 2022

(65) Prior Publication Data
US 2023/0319135 A1    Oct. 5, 2023

(51) Int. Cl.
*H04L 67/10* (2022.01)
*G06F 9/50* (2006.01)
(Continued)

(52) U.S. Cl.
CPC ........ *H04L 67/1029* (2013.01); *G06F 9/5094* (2013.01); *G06F 11/3058* (2013.01);
(Continued)

(58) Field of Classification Search
CPC ............... H04L 67/1029; G06F 9/5094; G06F 11/3058; G06F 11/3072; G06F 11/3433;
(Continued)

(56) References Cited

U.S. PATENT DOCUMENTS

| 9,201,933 B2 | 12/2015 | Phipps |
| 10,733,053 B1 | 8/2020 | Miller |

(Continued)

FOREIGN PATENT DOCUMENTS

CN    110855509 B    2/2021

OTHER PUBLICATIONS

"Optimize the Workload and Performance of Applications in the Cloud Environment with Over-Provisioning, Competition and Feedback Learning", An IP.com Prior Art Database Technical Disclosure, Authors et al.: Disclosed Anonymously, IP.com No. IPCOM000256142D, IP.com Electronic Publication Date: Nov. 7, 2018, 3 pages.

(Continued)

*Primary Examiner* — Tuan C Dao
(74) *Attorney, Agent, or Firm* — Stephen R. Yoder (57) ABSTRACT

An approach for optimizing server-based loads between data centers. The approach receives data from a hardware abstraction layer (HAL) associated with servers in a plurality of data centers. The approach filters the data associated with a portion of the data centers having the highest power usage and thermal state conditions. The approach aggregates the filtered data into performance data groups based on association with a data center. The approach creates two-ratio statistics of the aggregated groups. The approach generates a data center score based on the two-ratio statistics. The approach selects data center sites with the lowest scores. The approach initiates a request to transfer server-based loads from the servers associated with the filtered data to the data center sites with the lowest scores.

17 Claims, 5 Drawing Sheets

(51) Int. Cl.
*G06F 11/30* (2006.01)
*G06F 11/34* (2006.01)
*H04L 67/1029* (2022.01)

(52) U.S. Cl.
CPC ...... *G06F 11/3072* (2013.01); *G06F 11/3433* (2013.01); *G06F 11/3452* (2013.01); *G06F 2209/508* (2013.01); *G06F 2209/509* (2013.01)

(58) Field of Classification Search
CPC ........... G06F 11/3452; G06F 2209/508; G06F 2209/509; G06F 9/5088
See application file for complete search history.

(56) References Cited

U.S. PATENT DOCUMENTS

| | | | |
|---|---|---|---|
| 10,866,912 | B2 | 12/2020 | Hayashida |
| 11,176,589 | B2 | 11/2021 | Pyati |
| 2002/0007417 | A1* | 1/2002 | Taylor .............. H04N 21/23116 725/87 |
| 2009/0070229 | A1* | 3/2009 | Ansari ............... G06Q 30/0603 705/26.1 |
| 2009/0179080 | A1* | 7/2009 | Alston ............... B60H 1/00378 392/407 |
| 2012/0254269 | A1* | 10/2012 | Carmichael ......... H04L 43/0876 709/224 |
| 2014/0304411 | A1* | 10/2014 | Kleyn ..................... G06F 1/20 709/226 |
| 2014/0344504 | A1* | 11/2014 | Luo .................... G06F 12/0842 711/103 |
| 2015/0271290 | A1* | 9/2015 | Tao ...................... H04W 4/021 709/217 |
| 2015/0339132 | A1* | 11/2015 | Chen .................... G06F 15/177 713/100 |
| 2015/0358236 | A1* | 12/2015 | Roach ................ H04L 41/0896 370/235 |
| 2016/0224081 | A1* | 8/2016 | Worthington ....... G06F 11/3058 |
| 2016/0363976 | A1* | 12/2016 | Gatson ..................... G06F 1/26 |
| 2016/0371081 | A1* | 12/2016 | Powers ............... G06F 9/45504 |
| 2017/0003991 | A1* | 1/2017 | Strandzhev ............... G06F 9/50 |
| 2018/0041604 | A1* | 2/2018 | Poblete ................. H04L 67/561 |
| 2019/0065345 | A1* | 2/2019 | Patel ................... G06F 11/3684 |
| 2019/0206569 | A1 | 7/2019 | Shelton, IV |
| 2019/0220285 | A1* | 7/2019 | Ali ......................... G06F 9/4401 |
| 2019/0278626 | A1* | 9/2019 | Kodama ............... G06F 9/5094 |
| 2020/0310947 | A1 | 10/2020 | Watson |
| 2021/0141695 | A1* | 5/2021 | Correia Villa Real ..................... G06F 3/0619 |

OTHER PUBLICATIONS

Burgener et al., "Optimizing Workload Placement in Your Hybrid Cloud", White Paper, International Data Corporation #US46637920, Jul. 2020, 19 pages.

Chard et al., "Cost-Aware Cloud Profiling, Prediction, and Provisioning as a Service", Middleware for Multicloud, IEEE Cloud Computing, Jul./Aug. 2017, pp. 48-59.

Dabbagh et al., "Smart Energy Management in Data Centers", An IP.com Prior Art Database Technical Disclosure, IP.com No. IPCOM000246061D, IP.com Electronic Publication Date: Apr. 29, 2016, 10 pages.

Mell et al., "The NIST Definition of Cloud Computing", Recommendations of the National Institute of Standards and Technology, Special Publication 800-145, Sep. 2011, 7 pages.

Nedeltchev et al., "Infrastructure as a Service Cloud and Data Center Predictive Expanding and Contracting Workload Optimization Based on Real Time Usage", An IP.com Prior Art Database Technical Disclosure, IP.com No. IPCOM000251798D, IP.com Electronic Publication Date: Dec. 4, 2017, 9 pages.

Pantazoglou et al., "Decentralized and Energy-Efficient Workload Management in Enterprise Clouds", IEEE Transactions on Cloud Computing, vol. X, No. Y, Month 201X, DOI: 10.1109/TCC.2015.2464817, Aug. 2015, 15 pages.

Yousif et al., "Clustering Cloud Workload Traces to Improve the Performance of Cloud Data Centers", Proceedings of the World Congress on Engineering 2017, vol. I, WCE 2017, Jul. 5-7, 2017, London, U.K., 5 pages.

* cited by examiner

CLOUD FINANCIAL LOAD OPTIMIZATION BASED ON POWER AND THERMAL STATISTICS AGGREGATION

TECHNICAL FIELD

The present invention relates generally to cloud load optimization, and specifically, to financial load optimization based on power and thermal statistics aggregation.

BACKGROUND

Current cloud solutions do not have a mechanism to retrieve thermal and/or power information associated with the hardware, e.g., thermal sensors, power sensors, ambient conditions data, data center utilization information, in a RESTful cloud friendly way, e.g., that a customer can access from anywhere at any time. The reason for this is that a cloud-based infrastructure is designed to abstract out the hardware layer, so the customer does not need to concern themselves with low-level hardware issues.

This effort to relieve the customer of concerns about the hardware layer has created a new issue for the increasing number of hybrid cloud systems. Implementation of hybrid cloud systems require customers to have access to information about the on-premises hardware in a cloud friendly manner for use of intelligent deployment of hardware services.

BRIEF SUMMARY

According to an embodiment of the present invention, a computer-implemented method for optimizing server-based loads between data centers, the computer-implemented method comprising: receiving, by one or more processors, data from hardware abstract layers (HAL) associated with servers in a plurality of data centers; filtering, by the one or more processors, data associated with a portion of the plurality of data centers based on data centers having the highest power usage and thermal state conditions; aggregating, by the one or more processors, the filtered data into performance data groups based on association with a data center; creating, by the one or more processors, two-ratio statistics of the aggregated groups; generating, by the one or more processors, a data center score based on the two-ratio statistics; selecting, by the one or more processors, data center sites with the lowest scores; and initiating, by the one or more processors, a request to transfer server-based loads from the servers associated with the filtered data to the data center sites with the lowest scores.

According to an embodiment of the present invention, a computer program product for optimizing server-based loads between data centers, the computer program product comprising: one or more non-transitory computer readable storage media and program instructions stored on the one or more non-transitory computer readable storage media, the program instructions comprising: program instructions to receive data from hardware abstract layers (HAL) associated with servers in a plurality of data centers; program instructions to filter data associated with a portion of the plurality of data centers based on data centers having the highest power usage and thermal state conditions; program instructions to aggregate the filtered data into performance data groups based on association with a data center; program instructions to create two-ratio statistics of the aggregated groups; program instructions to generate a data center score based on the two-ratio statistics; program instructions to select data center sites with the lowest scores; and program instructions to initiate a request to transfer server-based loads from the servers associated with the filtered data to the data center sites with the lowest scores.

According to an embodiment of the present invention, a computer system for optimizing server-based loads between data centers, the computer system comprising: one or more computer processors; one or more non-transitory computer readable storage media; and program instructions stored on the one or more non-transitory computer readable storage media, the program instructions comprising: program instructions to receive data from hardware abstract layers (HAL) associated with servers in a plurality of data centers; program instructions to filter data associated with a portion of the plurality of data centers based on data centers having the highest power usage and thermal state conditions; program instructions to aggregate the filtered data into performance data groups based on association with a data center; program instructions to create two-ratio statistics of the aggregated groups; program instructions to generate a data center score based on the two-ratio statistics; program instructions to select data center sites with the lowest scores; and program instructions to initiate a request to transfer server-based loads from the servers associated with the filtered data to the data center sites with the lowest scores.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for improving statistical/report query performance based on a prepared commit in a data virtualization system. Accordingly, in the data virtualization system, improving the pre-processing before query submission can optimize and merge the queries of the same table from the same data source and reduce both the number of network transmissions and the chance of scanning the whole table of the data source.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
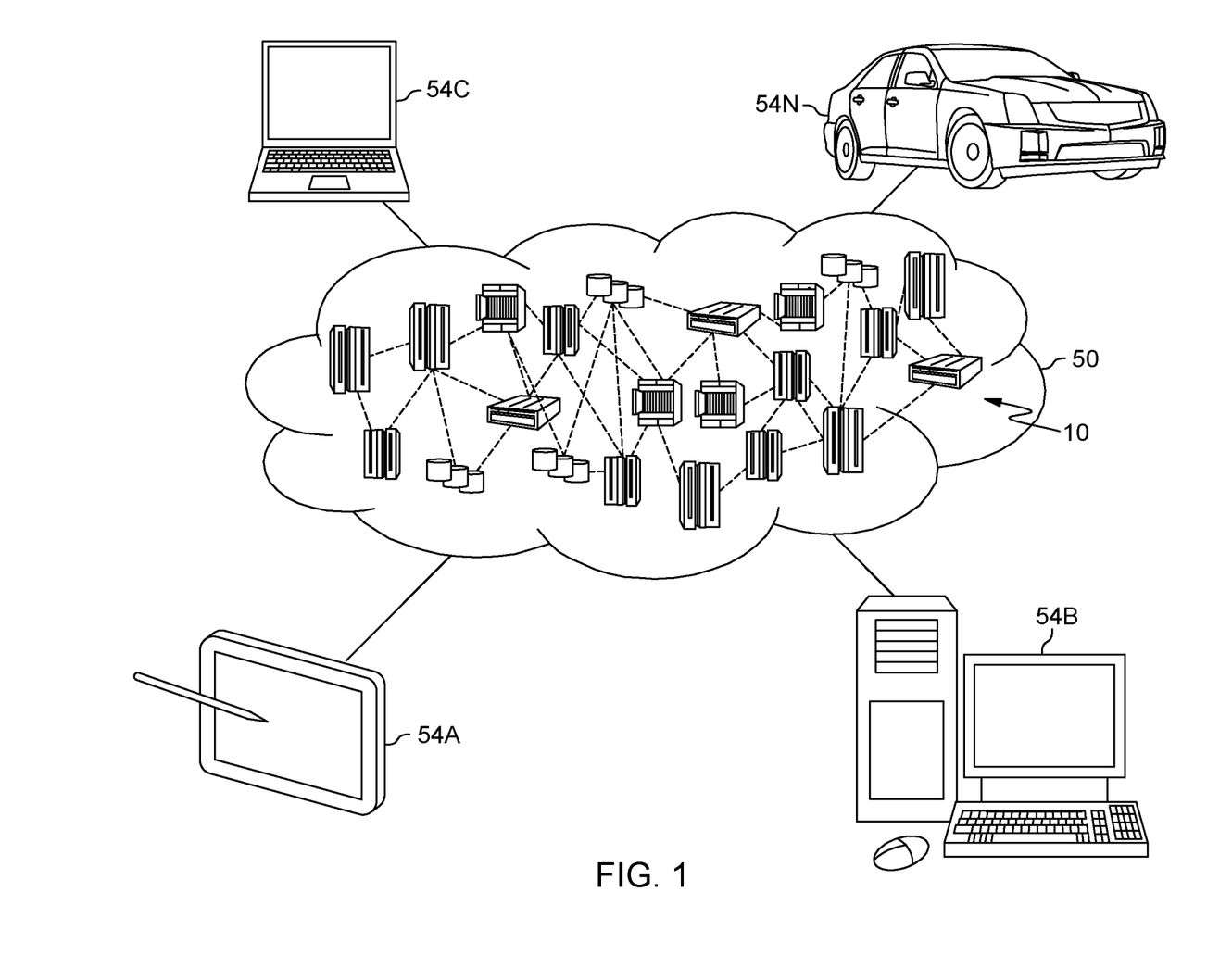
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
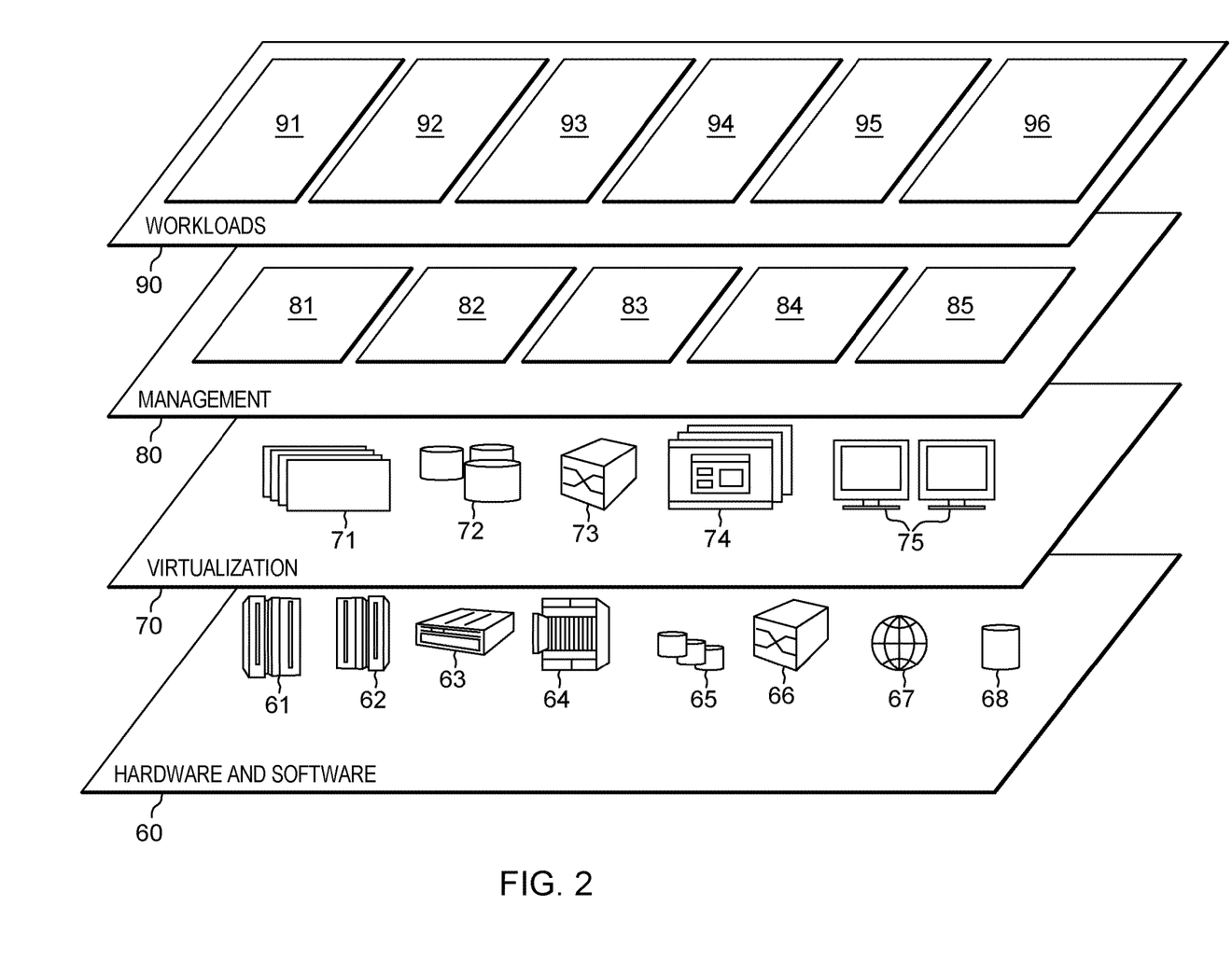
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and hardware abstraction layer (HAL) data management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
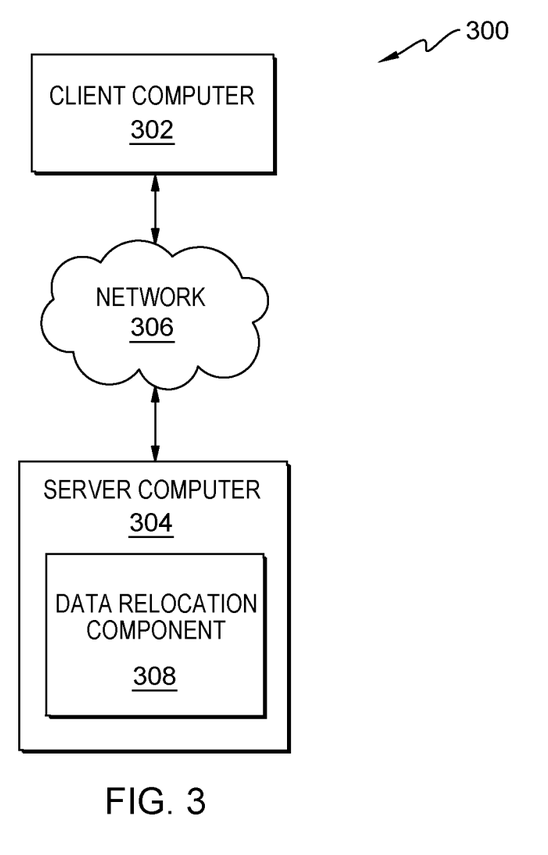
FIG. 3 is a high-level architecture, according to embodiments of the present invention.
Figure 4:
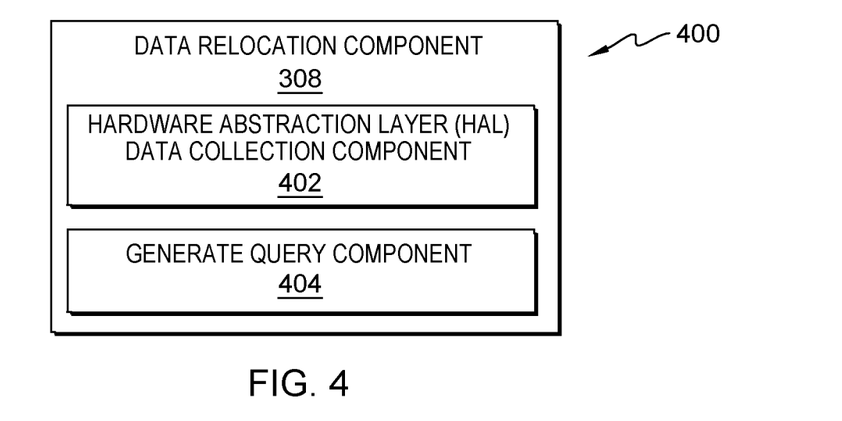
FIG. 4 is an exemplary detailed architecture, according to embodiments of the present invention.
Figure 5:
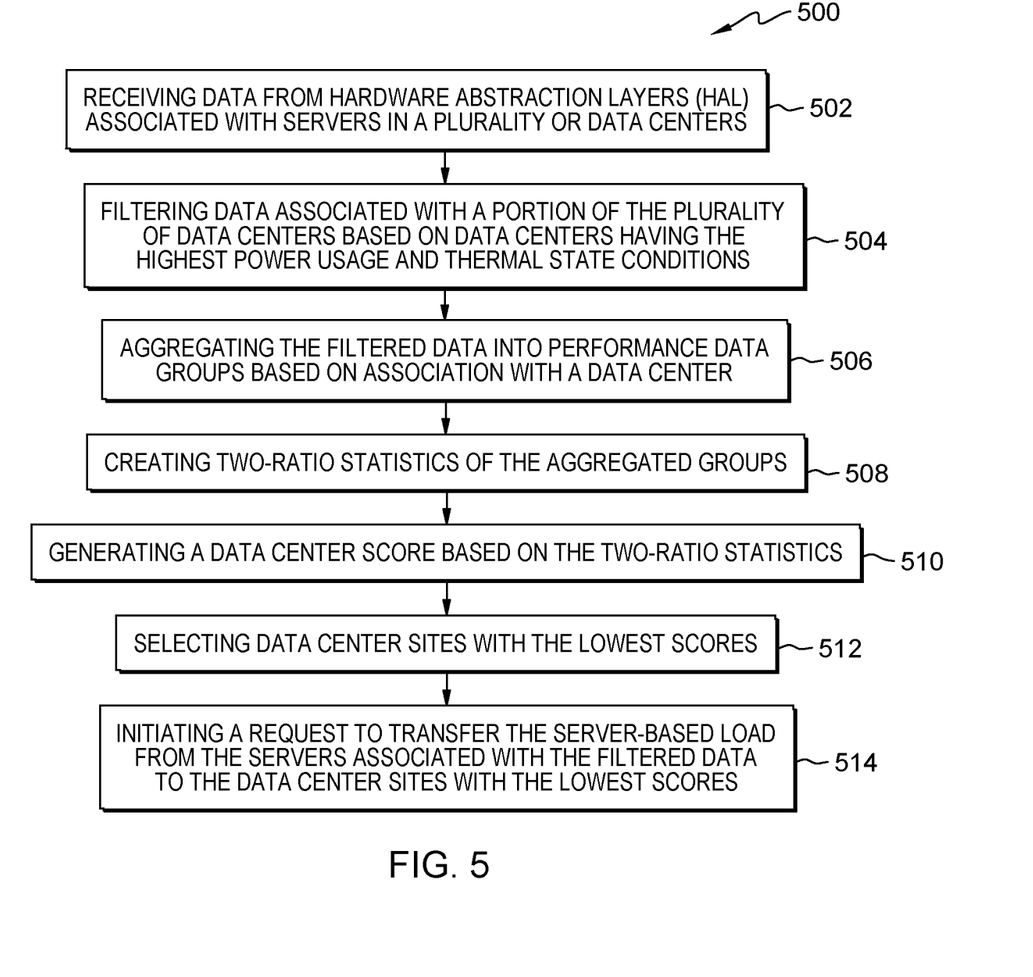
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a deadlock prevention system, to which the invention principles may be applied. The architecture 300 comprises a client computer 302, a data relocation component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one aspect of an embodiment of the present invention, data relocation component 308, operational on server computer 304, can retrieve Hardware Abstraction Layer (HAL) data, presented as health status of the associated hardware or other hardware status information through an interface, e.g., a Rest API, in a portable, scalable, and persistent manner.

In another aspect of an embodiment, data relocation component 308 can use the HAL generated data for intelligent deployment of hardware services. For example, data center administrators can use predictive cost analytics combined with aggregate power and thermal usage across a multi-site hybrid cloud environment to optimize loads between sites for maximum financial savings while minimizing application latency.

In another aspect of embodiments of the present invention, data relocation component 308 can provide increased system reliability and serviceability in a cloud-based infrastructure. Data relocation component 308 can provide data center status of hardware through a cloud interface using Rest API hooks provided by a HAL. Administrators can analyze power and fan usage across a hybrid cloud environment and can move processing and/or data loads between data center environments to reduce the cost of heating/cooling. This information could be presented though applications such as, but not limited to, the Storage Insights application to offer greater value to administrators and existing management applications.

In another aspect of embodiments of the present invention, data relocation component 308 can provide a hardware development and parts selection determination process that can use the information provided from the field such as, but not limited to, power usage and heat dissipation capabilities. It should be noted that this information can provide the capability to perform post-operation analysis and future parts selection during the early hardware development process.

For example, the Turbonomics application is good example on how this information could be used. This information could be supplied to the Turbonomics, machine learning, cost efficiency algorithm as a supply or demand metric to help determine the most cost-efficient method of operating applications while maintaining acceptable QoS.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a data relocation component 308, which can further comprise hardware abstraction layer (HAL) data collection component 402 and generate query component 404.

In one aspect of an embodiment of the present invention, HAL data collection component 402 can collect data, e.g., power cost data, data center thermal data, internal and external environmental data, etc. form a plurality of data centers in a plurality of geographical locations. In one aspect of an embodiment, HAL data can be collected, aggregated and stored on a one minute interval on a per data center site basis.

For example, in another aspect of an embodiment of the present invention, HAL data collection component 402 can receive data or status information from the hardware via automated commands on the system by HAL or initiated by an administrator based on a HAL running "ipmitool," "smartctl" or "mdadm" commands for data on thermal sensors, power supplies, fan speeds, heating, ventilation and air conditioning (HVAC) systems, etc. It should be noted that commands can forward output to separate queues that a HAL can parse and then store the data within its database. In another aspect of an embodiment, HAL data collection component 402 can retrieve the data from the queue, e.g., a HAL can parse the data for the specific data of the request, store the refined data in the component state database for use by a Rest API. It should be noted that the database can be persisted via a redundancy mechanism, allowing the data to remain between calls and across system reboots.

In another aspect of an embodiment of the present invention, HAL data collection component 402 can retrieve the desired data with a Rest(ful) API server. HAL data collection component 402 can initiate a Rest API request from any location through a web link based on VPN access to a desired computer/server. For example, the request can be sent to the Rest API server, wherein the Rest API server queries the database for specific data associated with the request. In another aspect of an embodiment, the server returns the data in a Javascript Object Notation (JSON) format for use in the cloud context by HAL data collection component 402. It should be noted that the format of the returned data can vary based on the requirements of the hardware service or the server running the hardware service.

In one aspect of an embodiment, generate query component 404 can perform a cloud-based dollar analysis, based on factors such as, but not limited to, Input/Output Operations per Second (IOPS), Watt usage, or British Thermal Unit (BTU) usage of the collected HAL data. The generate query component 404, e.g., cloud layer application, can use the HAL generated data to intelligently deploy hardware-side services. For example, a spike in power usage or thermal conditions is detected and initiates a portion of the data retrieval. In another aspect of an embodiment, generate query component 404 can provide a filtering algorithm to analyze peak usage and select sites with highest running average power, thermal state.

In another aspect of an embodiment, generate query component 404 can collect aggregate performance data of identified sites in a Hybrid cloud based on parameters such as, but not limited to IOPS, central processing unit (CPU) bandwidth, CPU latency, etc. In another aspect of an embodiment, generate query component 404 can create two-ratio statistics of Aggregate Performance per Watt per Dollar, and Aggregate Performance per BTU per Dollar for data center sites under consideration. It should be noted that these statistics can be weighted if desired. In another aspect of an embodiment, generate query component 404 can combine weighted ratio statistics into a single score for each site and compare sites with respect to a running average. Based on this comparison, generate query component 404 can select a site(s) with a lowest running average(s) and initiate a request to transfer primary storage status to the selected site(s).

For example, data relocation component 308 can determine the IOPS per watt per dollar between a data center located in Houston, TX and a data center in Toronto, ON and then offload data when needed. During the winter, when the Toronto data center requires heat for operation, resource load can be transferred to the Houston data center. During the summer, when the Houston data center requires cooling for operation, resource load can be transferred to the Toronto data center. In a similar analysis, analyzing latency data can lead to transferring caching to a specific location.

In another example, data relocation component 308 can request data from a plurality of HAL layers for aggregation through a REST API. Data relocation component 308 can aggregate the received data into a pair of ratios, a thermal cost ratio and a power cost ratio. It should be noted that the ratios can include independent weightings, if desired. It should further be noted that the ratio pairs are calculated for the desired data center sites. Data relocation component 308 can compare the thermal cost ratio and the power cost ratio for the sites of interest and determine the sites with the highest ratio and the lowest ratio. Data relocation component 308 can provide recommendations based on moving storage from the data center site with the highest ratio pairs to the data center site with the lowest ratio pairs.

FIG. 5 is an exemplary flowchart of a method 500 for optimizing server-based loads between data centers. At step 502, an embodiment can receive, via HAL data collection component 402, data from HALs associated with servers in a plurality of data centers. At step 504, the embodiment can filter, via HAL data collection component 402, data associated with a portion of the plurality of data centers based on data centers having the highest power usage and thermal state conditions. At step 506, the embodiment can aggregate, via HAL data collection component 402, the filtered data into performance data groups based on association with a data center. At step 508, the embodiment can create, via generate query component 404, two-ratio statistics of the aggregated groups. At step 510, the embodiment can generate, via generate query component 404, a data center score based on the two-ratio statistics. At step 512, the embodiment can select, via generate query component 404, data center sites with the lowest scores. At step 514, the embodiment can initiate, via generate query component 404, a request to transfer server-based loads from the servers associated with the filtered data to the data center sites with the lowest scores.

Figure 6:
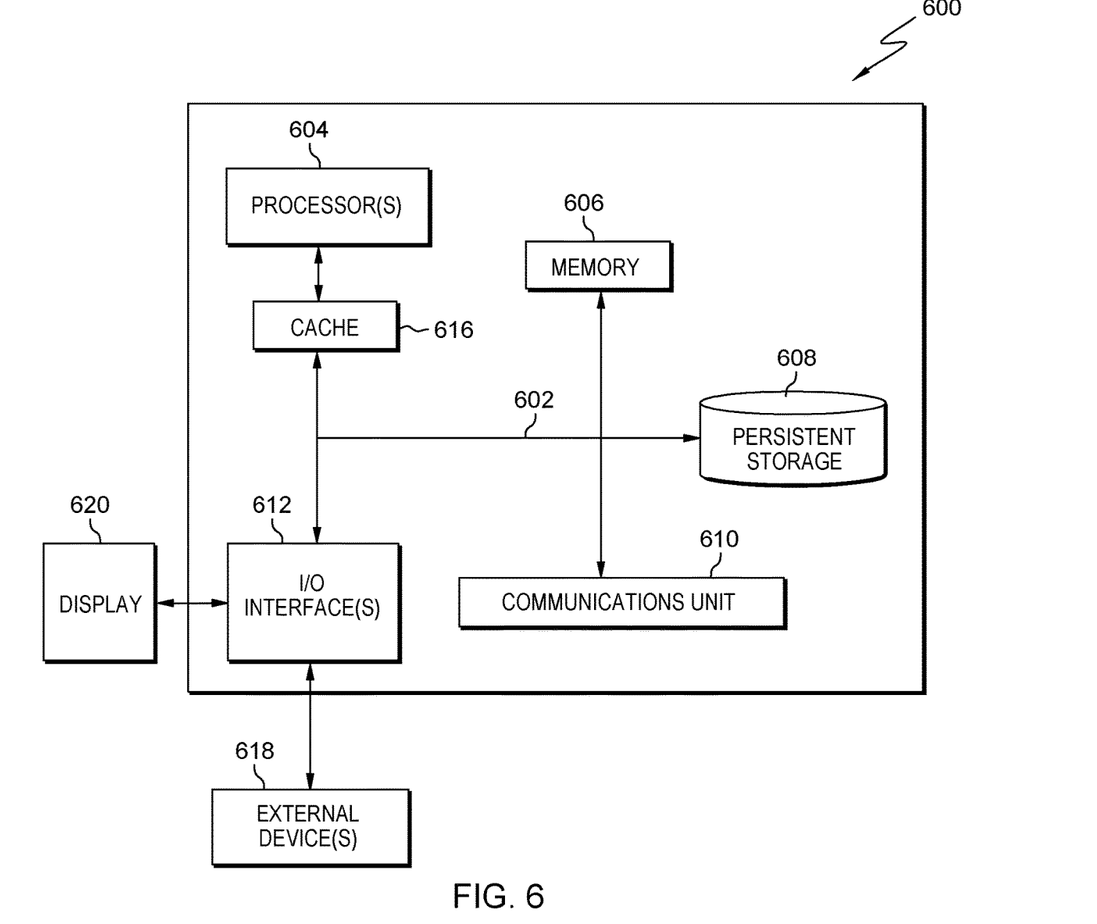
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O inter-face(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing server-based loads between data centers, the computer-implemented method comprising:
   receiving, by one or more processors, data from hardware abstract layers (HAL) associated with servers in a plurality of data centers;
   filtering, by the one or more processors, data associated with a portion of the plurality of data centers based on data centers having highest power usage and thermal state conditions;
   aggregating, by the one or more processors, the filtered data into groups of performance data based on association with a data center;
   storing, by the one or more processors, aggregated performance data associated with the data centers in a database to persist the aggregated performance data between RESTful calls and system reboots;
   creating, by the one or more processors, two-ratio statistics based on the groups of performance data;
   generating, by the one or more processors, data center scores based on the two-ratio statistics;
   selecting, by the one or more processors, data center sites with lowest data center scores; and
   initiating, by the one or more processors, a request to transfer server-based loads from the servers associated with the filtered data to the data center sites with the lowest data center scores.

2. The computer-implemented method of claim 1, wherein the two-ratio statistics are at least one of aggregate performance per watt per dollar and aggregate performance per British Thermal Unit (BTU) per dollar.

3. The computer-implemented method of claim 1, wherein the performance data further comprises at least one of Input/Output Operations per second (IOPS), processor bandwidth or processor latency.

4. The computer-implemented method of claim 1, wherein the receiving is based on a request sent to a HAL based on a RESTful application programming Interface (API).

5. The computer-implemented method of claim 4, wherein a response to the request is returned in a Javascript Object Notation (JSON) format.

6. The computer-implemented method of claim 1, wherein the data from the HAL comprises data from thermal sensors, data from power supplies and data from heating, ventilation and air conditioning (HVAC) systems.

7. A computer program product for optimizing server-based loads between data centers, the computer program product comprising:
   one or more non-transitory computer readable storage media and program instructions stored on the one or more non-transitory computer readable storage media, the program instructions comprising:
   program instructions to receive data from hardware abstract layers (HAL) associated with servers in a plurality of data centers;
   program instructions to filter data associated with a portion of the plurality of data centers based on data centers having highest power usage and thermal state conditions;
   program instructions to aggregate the filtered data into groups of performance data based on association with a data center;
   program instructions to store the aggregated performance data associated with the data centers in a database to persist the aggregated performance data between RESTful calls and system reboots;
   program instructions to create two-ratio statistics based on the groups of performance data;
   program instructions to generate a data center score based on the two-ratio statistics;
   program instructions to select data center sites with lowest scores; and
   program instructions to initiate a request to transfer server-based loads from the servers associated with the filtered data to the data center sites with the lowest scores.

8. The computer program product of claim 7, wherein the two-ratio statistics are at least one of aggregate performance per watt per dollar and aggregate performance per British Thermal Unit (BTU) per dollar.

9. The computer program product of claim 7, wherein the performance data further comprises at least one of Input/Output Operations per second (IOPS), processor bandwidth or processor latency.

10. The computer program product of claim 7, wherein the receiving is based on a request sent to a HAL based on a RESTful application programming Interface (API).

11. The computer program product of claim 10, wherein a response to the request is returned in a Javascript Object Notation (JSON) format.

12. The computer program product of claim 7, wherein the data from the HAL comprises data from thermal sensors, data from power supplies and data from heating, ventilation and air conditioning (HVAC) systems.

13. A computer system for optimizing server-based loads between data centers, the computer system comprising:
   one or more computer processors;
   one or more non-transitory computer readable storage media; and
   program instructions stored on the one or more non-transitory computer readable storage media, the program instructions comprising:
   program instructions to receive data from hardware abstract layers (HAL) associated with servers in a plurality of data centers;

program instructions to filter data associated with a portion of the plurality of data centers based on data centers having highest power usage and thermal state conditions;

program instructions to aggregate the filtered data into groups of performance data based on association with a data center;

program instructions to store the aggregated performance data associated with the data centers in a database to persist the aggregated performance data between RESTful calls and system reboots;

program instructions to create two-ratio statistics of the performance data;

program instructions to generate a data center score based on the two-ratio statistics;

program instructions to select data center sites with lowest scores; and program instructions to initiate a request to transfer server-based loads from the servers associated with the filtered data to the data center sites with the lowest scores.

14. The computer system of claim 13, wherein the two-ratio statistics are at least one of aggregate performance per watt per dollar and aggregate performance per British Thermal Unit (BTU) per dollar.

15. The computer system of claim 13, wherein the performance data further comprises at least one of Input/Output Operations per second (IOPS), processor bandwidth or processor latency and wherein the data from the HAL comprises data from thermal sensors, data from power supplies and data from heating, ventilation, and air conditioning (HVAC) systems.

16. The computer system of claim 15, wherein the receiving is based on a request sent to a HAL based on a RESTful application programming Interface (API).

17. The computer system of claim 16, wherein a response to the request is returned in a Javascript Object Notation (JSON) format.

* * * * *